(12) United States Patent
Peterkofsky et al.

(10) Patent No.: US 8,626,540 B2
(45) Date of Patent: Jan. 7, 2014

(54) METHOD AND APPARATUS FOR TRANSPORTATION PLANNING BASED ON MISSION-SPECIFIC VEHICLE CAPACITY CONSTRAINTS

(75) Inventors: Roy I. Peterkofsky, San Francisco, CA (US); Hema Budaraju, Fremont, CA (US); Mei Yang, Albany, CA (US); Rongming Sun, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1880 days.

(21) Appl. No.: 11/136,045

(22) Filed: May 23, 2005

(65) Prior Publication Data

US 2006/0265234 A1 Nov. 23, 2006

(51) Int. Cl.
G06Q 10/00 (2012.01)
(52) U.S. Cl.
USPC .......................................... 705/7.11; 705/7.12
(58) Field of Classification Search
USPC ................................................ 705/7.11, 7.12
See application file for complete search history.

(56) References Cited

U.S. PATENT DOCUMENTS

| | | | | |
|---|---|---|---|---|
| 5,265,006 | A * | 11/1993 | Asthana et al. | 705/7.26 |
| 5,623,413 | A | 4/1997 | Matheson et al. | |
| 5,758,329 | A | 5/1998 | Wojcik et al. | 705/28 |
| 5,886,331 | A | 3/1999 | Lyons, Jr. | |
| 6,212,190 | B1 * | 4/2001 | Mulligan | 370/400 |
| 6,219,653 | B1 | 4/2001 | O'Neill et al. | |
| 6,526,341 | B1 | 2/2003 | Bird et al. | |
| 6,571,197 | B1 * | 5/2003 | Frank et al. | 702/175 |
| 6,937,992 | B1 * | 8/2005 | Benda et al. | 705/7.26 |
| 7,243,074 | B1 | 7/2007 | Pennisi, Jr. | |
| 7,313,530 | B2 | 12/2007 | Smith | |
| 7,363,126 | B1 * | 4/2008 | Zhong et al. | 701/25 |
| 2002/0019759 | A1 * | 2/2002 | Arunapuram et al. | 705/7 |
| 2002/0082893 | A1 * | 6/2002 | Barts et al. | 705/8 |

(Continued)

FOREIGN PATENT DOCUMENTS

| WO | WO 00/68856 | 11/2000 |
|---|---|---|
| WO | WO 00/68859 | 11/2000 |

OTHER PUBLICATIONS

"Capacity-based cost modeling for light rail and bus rapid transit system", by Hsu Rosa, Florida International University, Mar. 28, 2005.*

(Continued)

Primary Examiner — Scott L Jarrett
Assistant Examiner — Pan Choy
(74) Attorney, Agent, or Firm — Silicon Valley Patent Group LLP; Omkar Suryadevara

(57) ABSTRACT

A computer, for planning moves of freight using vehicles, determines one or more attributes of a mission, based on a group of shipments being consolidated into the mission, computes a total amount of freight to be moved, and decides on feasibility of performing the mission, using a vehicle of a given type based at least on each of (A) the amount of freight, (B) one or more attributes of the mission, and (C) multiple effective capacities of freight moveable by the type of vehicle being selected, which depend on the mission attribute(s). Multiple effective capacities for each vehicle type, and corresponding values of mission attribute(s) at which they are to be applied are stored in the computer ahead of time, based on industry experience. Examples of mission attribute(s) include (1) number of stops, (2) type of stops (whether pooling or not), and (3) a combination thereof.

20 Claims, 9 Drawing Sheets

(56) References Cited

U.S. PATENT DOCUMENTS

| | | | |
|---|---|---|---|
| 2002/0156663 A1* | 10/2002 | Weber et al. | 705/7 |
| 2003/0023465 A1* | 1/2003 | Smith et al. | 705/7 |
| 2004/0015409 A1* | 1/2004 | Chittenden et al. | 705/26 |
| 2004/0054554 A1* | 3/2004 | Barts et al. | 705/1 |
| 2004/0107110 A1 | 6/2004 | Gottlieb et al. | 705/1 |
| 2005/0040082 A1* | 2/2005 | Ogawa et al. | 209/1 |
| 2005/0209913 A1* | 9/2005 | Wied et al. | 705/12 |
| 2005/0246192 A1* | 11/2005 | Jauffred et al. | 705/1 |

OTHER PUBLICATIONS

"Distribution Strategies that Minimize Transportation and Inventory Costs", by Lawrence Burns et al., General Motors Research Laboratories, Warren, Michigan, 1984.*

"Cross-docking network design", by Mei Zhang, Ph.D., Georgia Institute of Technology, 1997.*

"SAP Transportation Management Solution", White Paper, SAP AG, 2000.*

"Cross-Docking and its Implications in Location-Distribution System", by Mehmet Gumus et al., Journal of Business Logistics, vol. 25, No. 2, 2004.*

"A Methodology for Delivery Operations Planning", by Hsien-Ming Chiu, University of Maryland, College Park, 1990; ProQuest Dissertations & Theses.*

"Transportation (LE-TRA)", Release 4.6C, SAP AG, 2001.*

"The Multiple-depot, Multiple-tour, Multiple-stop delivery problem", Peter Kroll, The Johns Hopkins University, 1988; ProQuest Dissertations and Theses.*

"Multi-Objective Simultaneous Stowage and Load Planning for a Container Ship with Container rehandle in Yard Stacks", by Akio lmai et al., Faculty of Maritime Science, Kobe University, Fukae, Higashinada, Japen, Oct. 2004.*

Oracle Corporation, Data Sheet—Oracle Transportation Planning, Sep. 2004, pp. 1-6.

Peterkofsky, R. "Introducing Transportation Planning: A New Solution for You", Slide presentation, Dec. 8, 2004, pp. 34.

Bill Schineller, "Joe's Juggling Act", OR/MS Today, Dec. 1998, pp. 1-8.

U.S. Appl. No. 11/136,167, filed May 23, 2005 by Javier Nicolas Sanchez et al.

Non-Final Rejection dated Sep. 22, 2009 in U.S. Appl. No. 11/136,167.

Amendment dated Jan. 22, 2010 in U.S. Appl. No. 11/136,167.

Final Rejection dated Apr. 22, 2010 in U.S. Appl. No. 11/136,167.

Notice of Allowance dated Jun. 24, 2010 in U.S. Appl. No. 11/136,167.

Applicant's Summary Interview with Examiner Jun. 16, 2010 in U.S. Appl. No. 11/136,167.

Frizzell, P.W. et al. "The Split Delivery Vehicle Scheduling Problem with Time Windows and Grid Network Distances", Computers OPS Res. vol. 22, No. 6, 1995 Elsevier Science Ltd., pp. 655-667.

Thompson, P. et al. "Cyclic Algorithms for Multivehicle Routing and Scheduling Problems". Operations Research, vol. 41, No. 5, 1993 INFORMS, retrieved from http://jstor.org/stable/171656, pp. 935-946.

Grunert, T. et al. "Planning Models for Long-Hault Operations of Postal and Express Shipment Companies", European Journal of Operational Research 122, 2000 Elsevier Science Ltd., pp. 289-309.

Peeta, S. et al. Multiple User Classes Real-Time Traffic Assignment for Online Operations: A Rolling Horizon Solution Framework, Transpn. Res. C., vol. 3, No. 2, 1995 Elsevier Science Ltd., pp. 83-98.

M2 Presswire, MANUGISTICS: Manugistics extends industry's most comprehensive transportation management solution, M2 Communications Ltd., Dec. 17, 1997, pp. 2.

U.S. Appl. No. 11/136,167, filed May 23, 2005.

* cited by examiner

| | EFFECTIVE CAPACITY OF 102" x 53' TRAILER | EFFECTIVE CAPACITY OF 102" x 48' TRAILER |
|---|---|---|
| Direct Mission | 3000 | 2000 |
| One Stop Mission | 2800 | 1800 |
| Multi-stop Mission | 2500 | 1600 |
| Pooling Mission | 2300 | 1400 |
| Multi-stop Mission with Pooling | 2000 | 1100 |

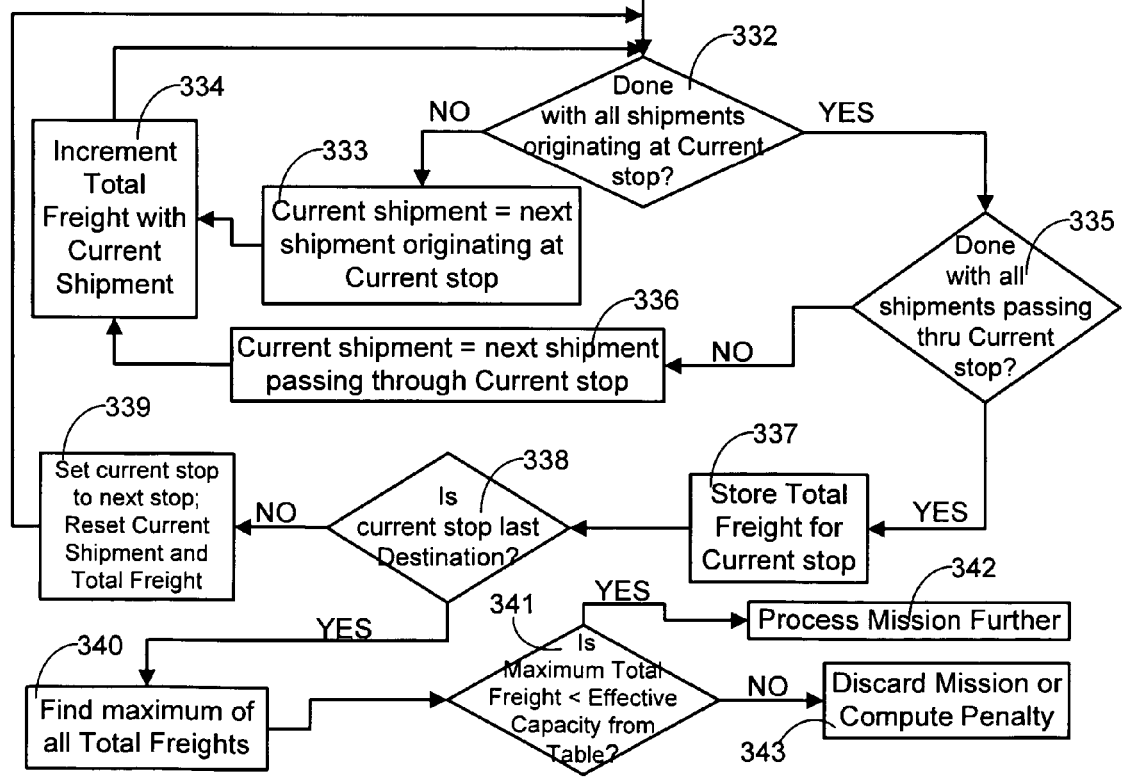

FIG. 6

ORACLE Transportation Execution

Diagnostics  Home  Logout  Preferences  Help

Bulkload | Carrier Selection | Constraints | Vehicles | Facilities | Carrier Services | Freight Payment | Setup Trips | Deliveries | Lines | Track Online | Lane Groups | View Requests

- Vehicle Types
- Vehicle Availability

Setup: Vehicles: Vehicle Types >

Create Vehicle Type

Cancel  Apply

Main Information | Additional Features

At least one of Maximum Load Weight, Pallet Floor Space, or Effective Volume Capacity for Direct Move is required.
* Indicates required field

| | |
|---|---|
| * Name | DV53 |
| * Master Organization | W1 |
| * Vehicle Class | Truck |
| * Status | Active |
| * Description | 53' Dry Van Trailer |
| Weight UOM | Pound |
| Volume UOM | Cubic Foot |
| Linear Dimension UOM | Inch |

Load Capacities

| | |
|---|---|
| Maximum Load Weight | 45000 |
| Internal Volume | 4037 |
| Pallet Floor Space | 30 |
| Pallet Stacking Height | 2 |

| | | |
|---|---|---|
| Effective Volume Capacity for Direct Move | 3000 | ⎫ |
| Pool Move | 2750 | |
| One-Stop Move | 2900 | ⎬ 601 |
| Two-Stop Move | 2800 | |
| Two-Pool Move | 2600 | |
| Three-Pool Move | 2500 | ⎭ |

Dimensions

| | |
|---|---|
| Tare Weight | 2850 |

METHOD AND APPARATUS FOR TRANSPORTATION PLANNING BASED ON MISSION-SPECIFIC VEHICLE CAPACITY CONSTRAINTS

BACKGROUND

Transportation planning by a shipper (who owns and/or controls freight) involves determining publicly-available means of moving the freight (also called cargo) from its origin to its destination through a number of strategies, such as consolidation of shipments, continuous moves of vehicles, as well as selection of carriers and modes (air, ground, sea). Reduction of cost is typically the predominant objective of a shipper in selecting specific means of transportation, although other business and service objectives may also be important considerations. Shipments (also known as transportation orders, shipment orders, delivery orders, or simply orders) are movements of freight and constitute the basic element of transportation planning.

Starting with orders for movement of freight (i.e. shipments), one element of transportation planning involves the shipper manually and/or automatically creating groups of shipments that can be moved together in a single vehicle (such as a truck or trailer), in a process known as load building or load consolidation. Specifically, load consolidation involves the shipper combining shipments of small sizes that otherwise would be sent by Less than TruckLoad (LTL) services or parcel (also known as small package) services into larger shipments that can be sent by Truckload services (also called "carriers") that operate wheeled vehicles on public highways. If well utilized full truckload shipments can be created, cost savings are achieved since the per unit costs of sending large shipments by Truckload service are usually less expensive than the per unit costs of sending small shipments by LTL or Parcel service. This only holds if the capacity of a truck or trailer is well utilized because the charges for a truckload movement generally vary only with the distance travelled, regardless of the amount of load in the truck. LTL and parcel charges, on the other hand, vary both with the size of the shipment and the distance covered. Truckload services are provided by, for example, J. B. Hunt, Schneider National and Werner Enterprises. LTL services are provided by, for example, Yellow Freight and Roadway Express. Parcel services are provided by, for example, UPS, FedEx and DHL.

One of the load consolidation strategies used by human transportation planners either manually or by using transportation planning systems is to group multiple small shipments into a truckload. Specifically, as shown in FIG. 1A, pooling (or hubbing or zone skipping) can involve bringing small shipments together at a consolidation center so that they can continue movement on a truckload service—instead of sending them all the way (point-to-point) by less-than-truckload (LTL) or parcel services which are higher priced. As further shown in FIG. 1B, this can also work in the other direction, breaking up a truckload from a single origin at a deconsolidation center for further transportation by LTL or parcel services. Finally, as shown in FIG. 1C a shipper can put both of these together using a truckload line haul between cross-docking (or pooling) facilities, with the remainder of the distance covered by LTL services or parcel services.

Another strategy used by a shipper for combining small shipments into truckloads is to have a single truck make multiple pickup and/or dropoff stops. These truckloads are called "multi-stop" truckloads and entail missions that pick up goods and/or drop them off in more than one location. FIG. 1D illustrates a combined multi-stop and pooling mission, in which a truck makes several pickups and then several dropoffs, one of which is at a deconsolidation center from where several orders continue to final delivery via LTL or parcel services. The cost of the mission is computed by a truckload service (also called "carrier") based on the distance traveled by the truck (applied as a per mile charge) as well as limited additional costs, including costs for each extra stop incurred on the route from the origin to the destination.

When executing a multi-stop truckload, the truck moves less than fully loaded for some part of its path between the first origin and the last destination, as illustrated in FIG. 1E. In this illustration, a single truck picks up three shipments bound for stops W, X, and Y at origin stop A. At stop B, the truck picks up another shipment traveling to stop W. The truck then proceeds to stop W. The truck drops the shipments from stops A and B that were bound for W at this stop. The truck proceeds with the remaining shipments picked up from A, bound for stops X and Y. At stop C, the truck picks up another shipment bound for stop Z. At stop X, the truck drops off the shipment picked up from A that was bound for X. The truck proceeds with the remaining shipments to stop D, where it picks up another shipment bound for stop Y. At stop Y, the truck drops off the two shipments, one from A and the other from D, which were bound for Y. The truck then proceeds to stop Z where it drops off the shipment picked up from C that was bound for Z.

Despite being underutilized in certain portions of a mission, e.g. between stops Y and Z in FIG. 1E, such multi-stop truckloads can provide a shipper with great economies versus LTL/parcel movement—the more so as a truck's overall utilization (averaged across the entire path) rises, and as the deviation from a geographically direct route between the first origination and the last destination decreases. Note that some carriers permit interspersing of loading and unloading stops as shown in FIG. 1E; other carriers require that all loading stops occur before the first unloading stop as shown in FIG. 1D.

The effective volume available in a truck or trailer is usually less than its physical volume, because shipments are not all of perfect sizes and shapes to fit exactly into the physical volume of the truck or trailer. For example, consider a standard 53' long×102" wide trailer (having a nose height of 110" and rear height of 112"). Assume that its physical volume is about 4,130 cubic feet. When loading this trailer, it is difficult (if not impossible) to fill it with 4,130 cubic feet of cargo (to "square out" the trailer). This is due to the irregularly varying sizes and shapes of the pieces of cargo as well as the need to leave room around the cargo to allow it to be inserted into and removed from the vehicle. Realistically, when using prior art transportation planning software to do load consolidation, a human transportation planner may set a single limit on the volume of cargo that can be fit practically in each type of vehicle. For example, the human operator may specify the maximum cargo that can be fit as follows: 2,850 cubic feet in a standard 53'×102" trailer, and 2,300 cubic feet in a standard 48'×102" trailer.

Most prior art transportation planning software (known to the present inventors) treats these operator-set limits as hard constraints—the prior art software won't build a truckload that exceeds these limits by even 1 cubic foot. In the above-described example, the prior art software may produce one trip and one shipment as follows: (1) a trip for a truckload of 2000 cubic feet which underutilizes the standard 53'×102" trailer and (2) a less-than truckload (LTL) shipment of 851 cubic feet which is expensive. Thus, the prior art software fails to capture savings from combination of orders in trip (1) and shipment (2), even when such savings are large and the risk that 2,851 cubic feet of cargo will actually not fit into the standard 53'×102" trailer (with its 4,130 cubic feet of interior space) is small.

All trips are presented to the transportation planner as items in a large transportation plan generated by the prior art software, it is very difficult and time consuming to manually go through the plan and detect such truckload combinations that are economical but that were not produced by the software. In the above described example, a transportation planner would have to manually detect that combining trip (1) and shipment (2) would barely exceed the operator-set limit by only 1 cubic foot.

Even assuming a detection feature exists in some prior art software that brings such combinations to the human operator's attention, a typical transportation plan that produces 300 multi-stop trips may have up to 30% of the truckloads (i.e. 90 truckloads) that need to be manually reviewed and reworked. If a human transportation planner spends just 5 minutes working on each truckload, that amounts to 7.5 hours or a full business day! Such amount of time spent in repairing existing truckloads negates the time savings from doing transportation planning automatically in the first place.

US Patent Application 2004/0107110 filed by Jens Gottlieb et al., published Jun. 3, 2004, entitled "Optimization of transport with multiple vehicles" is hereby incorporated by reference herein in its entirety. The reader is requested to review this patent application in detail. Briefly, this patent application describes optimizing a total cost associated with transporting products on a set of vehicles. Orders representing products are assigned to one or more vehicles in the set. The assignment defines a sequence of pickup and delivery activities for the vehicles. One or more orders are deleted from one or more vehicles; at least one order from the deleted orders is inserted into a vehicle; the assignment is changed for at least one vehicle; and a cost is determined for the transportation of the products on the set of vehicles. The steps of deleting one or more orders, inserting at least one order, changing the assignment, and determining a cost, are repeated until an optimal cost has been determined.

US Patent Application 2004/0107110 also discusses vehicle limitations that specify restrictions on using a vehicle for transportation. For example, the vehicle can be used on a limited route or schedule. Examples of such vehicles include fixed-trip vehicles, such as trains or ships, that operate on predefined routes according to strict schedules. Alternatively, such vehicles can be large trucks that cannot travel but on certain roads. The vehicle can have driving limits specifying a maximum time, distance, or intermediate stops for a single trip.

US Patent Application 2004/0107110 also states that vehicle limitations can further include loading capacities, that is, limitations on the amount of goods that can be loaded into a vehicle. The loading capacities can include weight, volume, or pallet limitations, or any other limitations in arbitrary dimensions and units. The vehicle limitations can also include restrictions on the types of goods the vehicle can transport. Also, a fixed-trip vehicle can have a loading capacity calendar that characterizes the loading capacity as a function of the time. For example, a train or a ship can have different restrictions on the loading capacity at different locations or at different times. Note that this method pertains to one particular variant of the transportation planning problem commonly known as the "Fleet Routing Problem" or "Vehicle Scheduling Problem" or "Vehicle Routing and Scheduling Problem" wherein the transportation orders are to be assigned to a known finite set of vehicles (e.g. 35 trucks owned by a furniture seller).

For additional patent prior art, see U.S. Pat. No. 5,758,329 granted to Wojcik et al. on May 26, 1998, and entitled "System for Managing Customer Orders and Method of Implementation" that is incorporated by reference herein its entirety. In particular FIG. 13 and the related description from the bottom of column 8 to the top of column 10 of this patent refers to different weights of different commodities being able to fit in the same trailer but this is the result of goods of different densities (juice and meat) being constrained by the same volume or "cube" limitation. A particular volume of meat weighs more than the same volume of juice and hence a greater weight of meat can be accommodated in the trailer, until the maximum limit on truckload volume (cube) is exceeded.

See also US Patent Application 2002/0019759 by Arunapuram, Sundararajan et al. published Feb. 14, 2002 and entitled "Transportation planning, execution, and freight payments managers and related methods." which is hereby incorporated by reference herein in its entirety.

Numerous articles have been written and published on transportation planning. For general background, see an article entitled "Joe's Juggling Act," *OR/MS Today*, December 1998.

SUMMARY

A computer is programmed in accordance with the invention to selectively use, in creating a mission to move freight, one of a number of capacities of a vehicle (of a given type) that are different for different values of one or more attribute(s) of the mission. A mission's attribute(s) can be, for example, the number and type of stops the vehicle makes. The computer's use of a vehicle capacity constraint that is mission specific in accordance with the invention is in contrast to prior art's use of a single vehicle capacity, regardless of the nature of the mission.

Specifically, for a given type of vehicle, if a proposed mission is simple (e.g. a direct move with no intermediate stops), then the computer is programmed in accordance with the invention to permit a predetermined maximum amount (e.g. volume) of freight to be moved in the mission. This computer is further programmed in some embodiments to progressively reduce the amount of freight that can be moved by the same given type vehicle, as the mission becomes progressively more difficult to load and unload, e.g. as the number of stops increases and/or if consolidation(s) and/or deconsolidation(s) (i.e. "pooling") is required at one or more stops. Therefore, the computer is programmed to account for the reality that, as additional constraints are placed on what can go where in a truck or trailer, the volume of goods that can fit inside is reduced accordingly. Specifically, because goods that must be loaded or unloaded at different stops can't be mixed together (because doing so will, among other things, impede the loading and unloading activities), such additional constraints appear as the nature of the truck's mission becomes more complicated.

In many embodiments of the invention, the computer is programmed to automatically plan moves of freight by (1) initially determining one or more attribute(s) of a mission currently being formed by combining two or more shipment orders, (2) computing an amount of freight to be moved in the mission, and (3) deciding on feasibility of performing the mission using a vehicle of a given type (such as a standard 53'×102" trailer), based on least each of (A) the computed amount of freight, (B) attribute(s) of the mission, and (C)

multiple effective capacities for loading freight into the vehicle of the given type, which change depending on the mission attribute(s).

An attribute of a mission that is used to identify a vehicle's effective capacity for that mission, can be any attribute that is a characteristic or property of the mission as a whole. The value of such attribute(s) is/are automatically derived, from details of shipment orders being consolidated into the mission being proposed. Two attributes of a mission that are used in several embodiments are: (1) number of stops and (2) type of stops (whether pooling or non-pooling). Such attribute(s) of the mission may be used alone or in combination with each other or with other attribute(s), to identify an effective capacity from among several effective capacities for a vehicle of a given type (such as a standard 53'×102" trailer). The identified effective capacity is then used in the normal manner, to decide whether or not the mission is feasible, e.g. applied as a hard or soft constraint on the freight to be carried in the mission.

BRIEF DESCRIPTION OF THE FIGURES

FIGS. 3A and 3C illustrate, in flow charts, acts performed in certain embodiments of the method illustrated in FIG. 2A.

FIG. 3B illustrates, in a table, mapping between the number of stops of two types (pool and non-pool) and predetermined categories of missions, wherein each category has an effective capacity associated therewith.

FIG. 6 illustrates a graphical user interface through which a computer programmed in accordance with the invention receives from a user multiple effective capacities that depend on attributes of the mission.

DETAILED DESCRIPTION

Figure 2A:
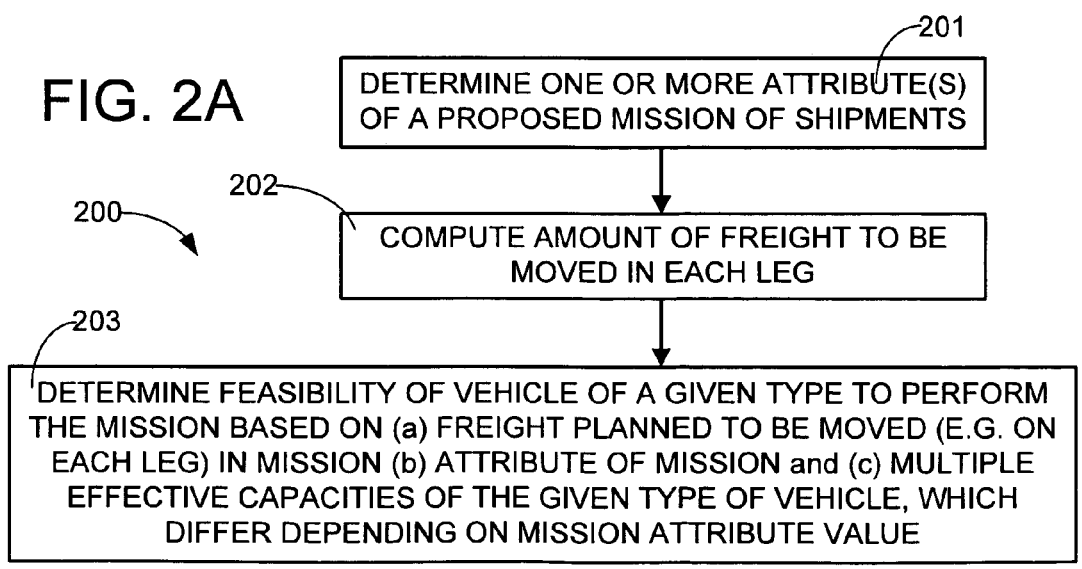
FIG. 2A illustrates, in a flow chart, a method in accordance with the invention that takes into account multiple effective capacities of a given type of vehicle as illustrated in FIG. 2B.

A computer is programmed, in accordance with the invention, to automatically plan movement of freight (i.e. cargo) by using wheeled vehicles that travel on public highways (or intermodal or maritime containers) to execute a mission (also called "trip" or "voyage" or "journey"), by performing acts 201-203 illustrated in FIG. 2A, which are described below. The mission, whose feasibility is decided on performance of acts 201-203 is proposed prior to method 200, by manual and/or automatic consolidation (i.e. grouping) of multiple shipment orders by a shipper (that owns and/or controls the freight) for travel by full Truckload (or full containerload) service, wherein each shipment would otherwise have traveled by LTL (or less-than-containerload) service or parcel service.

Regardless of how a mission of multiple shipments is proposed by a shipper, a computer is programmed in several embodiments of the invention to perform act 201 to determine one or more attribute(s) of the mission being proposed. A mission attribute that is determined in act 201 can be any characteristic or property of a mission as a whole, and its value can be derived in different ways depending on the embodiment, from one or more details of multiple shipment orders in the proposed mission. In some embodiments, the mission attribute is indicative of complexity of loading/unloading freight being moved by the mission, which in turn may depend on, e.g. number of stops, types of stops (pooling or non-pooling), and type of handling equipment available at the stops. In some embodiments, the mission attribute is indicative of one or more requirements of the goods to be carried, such as ventilation, airflow, refrigeration, and spacing.

For example, a mission is classified by a shipper in one embodiment into one of the following six types: (1) direct mission (no intermediate stops), (2) one stop mission (i.e. one intermediate stop between origin and destination), (3) multi-stop mission (i.e. two or more intermediate stops), (4) one pool mission (with one pooling or cross-docking stop), (5) two pool mission (with two pooling or cross-docking stops) and (6) multi-stop/pooling mission (with more than two pooling or cross-docking stops). In this embodiment, the mission illustrated in FIG. 1E has a total of 8 stops, of which 4 stops are pooling stops, and for this reason the computer, when appropriately programmed, determines this mission to be a multi-stop/pooling mission, which has the highest mission complexity (e.g. value 6).

Note that pooling is typically performed at a facility where shipments from different origins are consolidated together or where shipments traveling to different destinations can be deconsolidated. Moreover, cross-docking is performed at a facility where contents of multiple inbound missions are broken down and re-combined into multiple outbound missions. In addition to pooling and cross-docking stops, mission can have stops at which a simple pick-up or drop-off is performed and these are referred to herein as non-pooling stops (regardless of whether origin or destination).

As shown by act 202, the computer that performs act 201 is also programmed in accordance with the invention to compute an amount (e.g. volume) of freight to be moved by shipment orders grouped into the proposed mission. Although act 202 is illustrated as being performed after act 201 in FIG. 2A, the two acts can be performed in the reverse order in other embodiments. In some embodiments, a proposed mission for which acts 201 and 202 are performed is selected to be any existing mission to which a new shipment is to be added, which may or may not add a stop to or change the type of a stop already on a previously-existing mission to create the mission being proposed Some embodiments simply add up the freight onboard for any "leg" of a trip for which freight is being added.

Note that the word "trip" is used interchangeably herein with the word "mission" to identify certain information including but not limited to: (1) arrival and departure times, (2) origin and destination (3) goods to be transported, and (4) order(s) satisfied on performance. These two words, trip and mission are meant to be synonymous with the words voyage and journey.

Figure 1A:
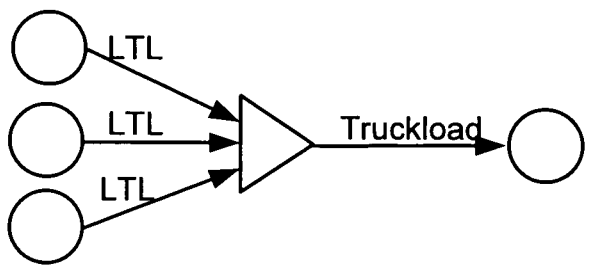
FIGS. 1A-1E illustrate, in block diagrams, load consolidations that can be performed in the prior art during transportation planning.
Figure 1B:
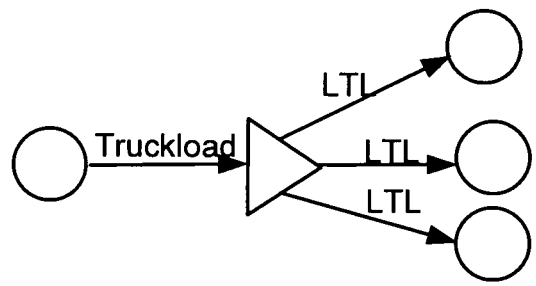
Figure 1C:
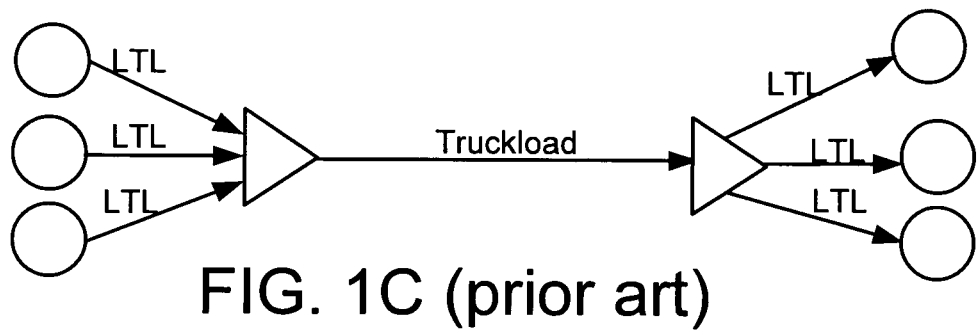
Figure 1D:
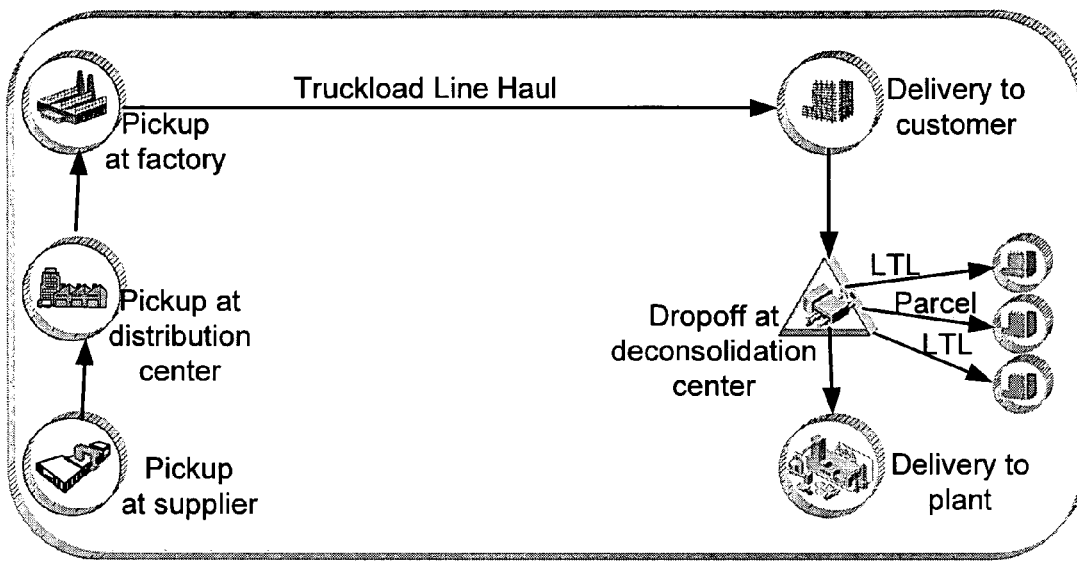
Figure 1E:
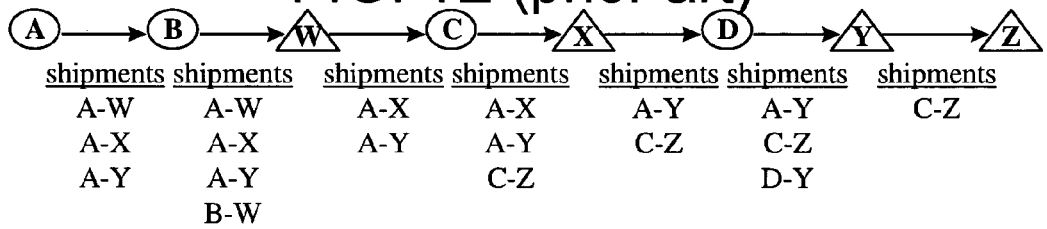

In the example illustrated in FIG. 1E, D-Y freight is added only on leg 6 of the 7 legs of the trip but its presence may place constraints on how freight can be loaded throughout the trip (because, for example, space may need to be "reserved" for it)—therefore adding freight on leg 6 can reduce the capacity on any other leg and, if it reduces it below the amount of freight already planned to be on board in that leg, it will violate constraints. In other words, adding freight on leg 6 can reduce the capacity of leg 2 below what's already planned on leg 2, therefore adding freight on leg 6 may be infeasible. If a new shipment being added is D-Y, then the previously-existing mission has all shipments except for D-Y and did not have a stop at D. For this reason, the previously-existing mission has its mission index at value 6 in the embodiment (described at the end of a paragraph above) which is the highest possible value. Hence addition of the new shipment D-Y does not further change the mission index of this embodiment (described above), even though the proposed mission contains a new stop D. Moreover, as per act 202, the amount of freight at stop D is computed to be 1530 cubic feet.

Note that, a specific leg of a mission, on which the amount of freight is computed, can be different depending on the embodiment. In some embodiments, a leg for computing the amount of freight in the mission is chosen to be anywhere two or more shipment orders (in the proposed mission) overlap one another. In such embodiments, it may be necessary to "reserve" space for a shipment on a later leg (such as leg 6) which constrains how goods can be loaded on earlier legs, even if the itineraries of no freight on such legs overlaps with those of the shipments on board (e.g. as of leg 6). In several embodiments, a leg at which the vehicle will have the most load, as compared to the rest of the mission, is used to compute the amount of freight. In the example illustrated in FIG. 1E, if each shipment is of an identical size of 510 cubic feet, then the mission has its most load in the portion B-W (i.e. between stops B and W). Hence in such embodiments, the volume 2040 cubic feet is computed between stops B and W, as the amount of freight in the mission.

A computer that performs acts 201 and 202 is further programmed in accordance with the invention to decide (as illustrated by act 203 in FIG. 2A) on the feasibility of performing the proposed mission using a vehicle of a given type (e.g. a truck with a standard 53'×102" trailer), based on at least each of (A) the computed amount of freight, (B) the one or more attributes of the proposed mission (used either directly or in the form of a mission type or mission index derived therefrom), and (C) multiple effective capacities of freight moveable by the vehicle of the given type, which differ depending on the mission attribute.

Figures 2B, 2C:
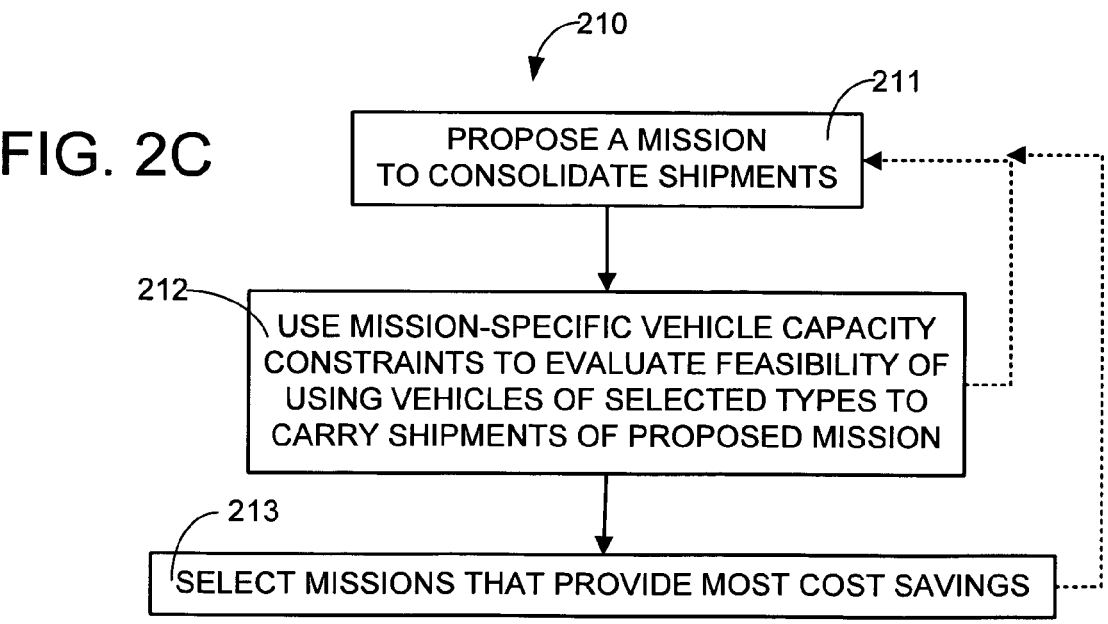
FIG. 2B illustrates, in a table, multiple effective capacities for two types of vehicles which differ depending on attributes indicative of complexity of a mission into which shipments are proposed to be consolidated.
FIG. 2C illustrates, in a flow chart, a transportation planning process that uses the method of FIG. 2A.

Note that the mission attribute being determined in act 201 and used in act 203 is chosen to be, in most embodiments, indicative of the complexity of loading and unloading freight in the mission, and for this reason the effective capacity is inversely related to such a mission attribute. One illustrative example of mission-specific vehicle capacities is shown in FIG. 2B. In the example of FIG. 2B, note that a truck with a standard 53'×102" trailer has five effective capacities 3000, 2800, 2500, 2300, and 2000 cubic feet, one for each of five possible values of a mission type or index. Similarly, a truck with a shorter 48'×102" trailer also has five effective capacities, in this embodiment as shown in FIG. 2B. Multiple effective capacities for a given type of vehicle may be specified to the computer by a transportation planner, as illustrated in FIG. 6.

At least two reasons require effective capacities of a given type of vehicle to become smaller, as a mission's loading/unloading complexity increases. One practice commonly followed in the transportation industry requires a demarcation between shipments going to different destinations. Specifically, shipments for each stop are kept separately from each other and not randomly mixed together. Physical bulkheads may even be inserted between the goods for each stop. This practice reduces the flexibility in how shipments can be packed into a truck and therefore reduces the effective capacity. Another industry practice requires shipments to be loaded and unloaded in the order of stops. It is not practical to load shipments going to an earlier stop in the front of a truck with only one single door at the rear, even if space is available in the front, because shipments would have to be unloaded and reloaded multiple times. Note that, typically, only the volume capacity of a vehicle is affected by business processes of some embodiments (because the same weight of freight is allowed to reach up to the legal limit of axle loads in these embodiments, regardless of the complexity of the mission).

Other reasons as to why the amount of cargo that fits in a trailer is less than the full space inside the trailer include (1) the need to leave space above and beside the cargo to allow it to be moved in and out of the vehicle; and (2) the sizes and shapes of different items are not coordinated to be fit together into a compact space—for illustration, the pieces of a jigsaw puzzle are coordinated perfectly to fit into 100% of a given space but this only happens if the pieces are laid out in a specific configuration. Any change to the sizes or shapes of any of the pieces will result in fewer of the pieces being able to be laid down on the puzzle board. Similarly, without precise advance knowledge of what goods go where in the vehicle, and precise planning of what order to put them in there, one could never fit all of the various goods into 100% of the allotted space. During normal operations in the real world, loading of the different goods into a truck or trailer cannot be controlled and planned so tightly as the pieces of a puzzle, and for this reason effective space utilization is reduced accordingly.

In some embodiments, constants of the type shown in FIG. 2B are predetermined for each type of mission (via user input in the screen of FIG. 6) as the respective effective capacities for each vehicle type, and are stored in a table. The table of FIG. 2B is looked up during performance of act 203 by use of a mission index. Hence, in the above-described example, with a value of 5 for the mission index, the table of FIG. 2B yields 2000 cubic feet as the effective capacity of the standard 53'×102" trailer when performing a mission of this complexity. Next, this effective capacity value (2000 cubic feet) is compared with the freight's volume of 2040 cubic feet (in embodiments that use the maximum freight volume in the mission). If effective capacity is applied as hard constraint, then this mission is determined to be not feasible, and performance of act 203 is complete.

Alternatively, if effective capacity is applied as a soft constraint, for example with a penalty of $5/cubic foot for up to 50 cubic feet of capacity violation, then the proposed mission is determined to be feasible (although a penalty of $200 is incurred). Use of effective capacity as a soft constraint models a vehicle's capacity flexibly, and the 2040 cubic feet mission may be implemented (if economically viable). Specifically, the effective capacity limit of 2000 is applied like a rubber band; the more money one can save by putting additional freight on the truck, the further it stretches. In that manner and with similar modeling advances, a computer programmed in accordance with the invention can eliminate most manual fixes of the type described in the BACKGROUND section above, and hence reduce the total time required to generate an actionable and optimized transportation plan. Of course, the extent to which this is true corresponds to the precision of the modeling of penalty values. Capturing a truer capacity of a given type of vehicle based on multiple values of one or more mission attributes as described herein improves that precision and eliminates more of the above-referenced manual fixes.

Use of mission-specific vehicle capacity constraints, as described in the above two paragraphs, to evaluate feasibility of using a vehicle of a given type to carry shipments of a proposed mission in accordance with the invention, improves on prior art methods of transportation planning that currently use a single effective capacity regardless of mission attribute (s). This is because prior art's use of a single effective capacity for all missions regardless of complexity makes the single capacity either too high for some missions or too low for some missions, or both i.e. too high for some and too low for others. For this reason, a transportation plan resulting from prior art's use of a single effective capacity can contain one or more missions with invalid loads, if the effective capacity was set too high. This can cause physical problems in real time, when shipments are being loaded into the vehicle. Alternatively, or in addition, prior art transportation planning software may miss consolidation opportunities if the single capacity is set to be too low (i.e. too conservative).

The exact manner in which mission-specific vehicle capacities are used in a computer, to determine a mission's feasibility in accordance with the invention can differ, depending on the embodiment. As will be apparent to a skilled computer programmer, a table need not be used in performing some embodiments of the invention. For example, several embodiments generate mission-specific vehicle capacities during performance of act 203, by use of a graph or a formula, with mission complexity as an input (to the graph or formula). Note that although in some embodiments, the effective capacity is determined by looking up predetermined values for different complexity missions, in other embodiments the effective capacity may be determined by computation using a formula.

For example, a formula might be CAPACITY (as function of number of additional stops X)=Baseline_Capacity−X*Y, where Y is an amount of capacity reduction for each additional stop and Baseline_Capacity is the maximum effective volume of the vehicle. Other embodiments, combine such a formula with another formula (required to determine the mission complexity as per act 201), to directly obtain a single effective capacity for a mission. Also some embodiments determine effective capacity that is mission specific, without explicitly computing number of stops and types of stops as follows. Such embodiments have flags associated with each trip representing a mission type, and move those flags up or down as stops are added to or removed from the trip, and thereafter associate a mission-specific capacity with the trip type and then are able to apply it without computing a number of stops.

For this reason, FIG. 2C illustrates a transportation planning process 210 in accordance with the invention, that generically performs act 212 by using a mission-specific vehicle capacity constraint to evaluate feasibility of using a vehicle of a given type (such as the standard 53'×102" trailer) to carry shipments of a proposed mission. As noted above, the exact manner in which act 212 is performed differs, depending on the embodiment, although specific operations to implement 212 have been illustrated by method 200 in FIG. 2A (described above).

Note that prior to invoking act 212, process 210 performs act 211 wherein a mission for consolidating shipments is proposed. In act 211, the exact manner in which a mission is proposed can differ, depending on the embodiment. For example, the computer may be programmed by any method known in the prior art to create a proposal for the mission, e.g. as described in one or more of the references identified in the BACKGROUND section above.

After performance of acts 211 and 212 for one mission, a computer of this invention may be programmed in some embodiments to repeat these two acts 211 and 212 iteratively, until all possible missions have been identified following which act 213 is performed. Alternatively, in other embodiments, the computer may be programmed to directly proceed from act 212 to an act 213 without repeating act 211 or 212. In act 213, the computer is programmed to select one or more mission(s) for performance. The specific criteria used in act 213, to select mission(s) can differ, depending on the embodiment, although most embodiments make their selection(s) based on whichever mission(s) provide (or are expected to provide) the most cost saving(s).

Although certain specific implementations are illustrated herein, as to how acts 211 and 213 are implemented in some embodiments, other embodiments may perform these acts 211 and 213 in a manner similar or identical to the manner normally performed in transportation planning software of the prior art, as modified by the addition of act 212 as illustrated in FIG. 2C. Prior art transportation management systems that can be modified to perform act 212 are available for direct purchase or as a web-hosted service from several vendors, such as the following:

(a) "i2 Transportation Planning and Management" available from i2 Technologies, Inc. One i2 Place, 11701 Luna Road, Dallas, Tex. 75234;

(b) "Manugistics Global Logistics Management solution" available from Manugistics, Inc. 9715 Key West Avenue, Rockville, Md. 20850

(c) "GC3 (Global Command & Control Center)" available from Global Logistics Technologies, 1 Reservoir Corporate Centre, Shelton, Conn. 06484;

(d) "DLx® Transportation Management System" available from Red Prairie of 20700 Swenson Drive, Waukesha, Wis. 53186;

(e) "Transportation Planning and Execution solution" available from Manahattan Associates, 2300 Windy Ridge Parkway, Suite 700, Atlanta, Ga. 30339; and (f) "Transportation Planning & Optimization" available from SAP America Inc. Strategic Planning & Support Office, 3999 West Chester Pike Newtown Square, Pa. 19073.

Note that one embodiment of the invention uses "Oracle Transportation Planning 11i.10" and "Oracle Transportation Execution 11i" both available from Oracle Corporation, 500 Oracle Parkway, Redwood Shores, Calif. 94065.

Use of mission-specific vehicle capacities in accordance with the invention differs from use of loading capacity calendars as described in US Patent Application 2004/0107110 for at least three reasons. An effective capacity that is determined for a vehicle of a given type in accordance with the invention is identified at run time during transportation planning, from among a number of effective capacities, depending on one or more attributes of a mission to be performed by the vehicle. In contrast, the loading capacity calendar of US Patent Application 2004/0107110 identifies a capacity that is pre-assigned to a fixed trip, regardless of the number and types of stops in the trip (wherein ships or airplanes of different sizes execute different instantiations of the same scheduled flight/voyage, therefore resulting in different loading capacities being made available for different instantiations of the scheduled trip).

Second, an effective capacity that is determined for a vehicle of a given type in accordance with the invention is applicable to any and all carriers that can perform the mission, if they use vehicles of a given type (e.g. standard 53'×102" trailer). In contrast, the loading capacity calendar of US Patent Application 2004/0107110 refers to scheduled trips performed at different times by different single vehicles of different sizes. Third, an effective capacity that is determined in accordance with the invention depends on mission attribute (s) indicative of complexity but it is independent of a specific schedule and route (i.e. independent of a specific route as opposed to the attributes of that route; effective capacity does depend on the attributes of a trip, but it doesn't vary from, say, one five-pool-stop route to another).

Figure 3A:
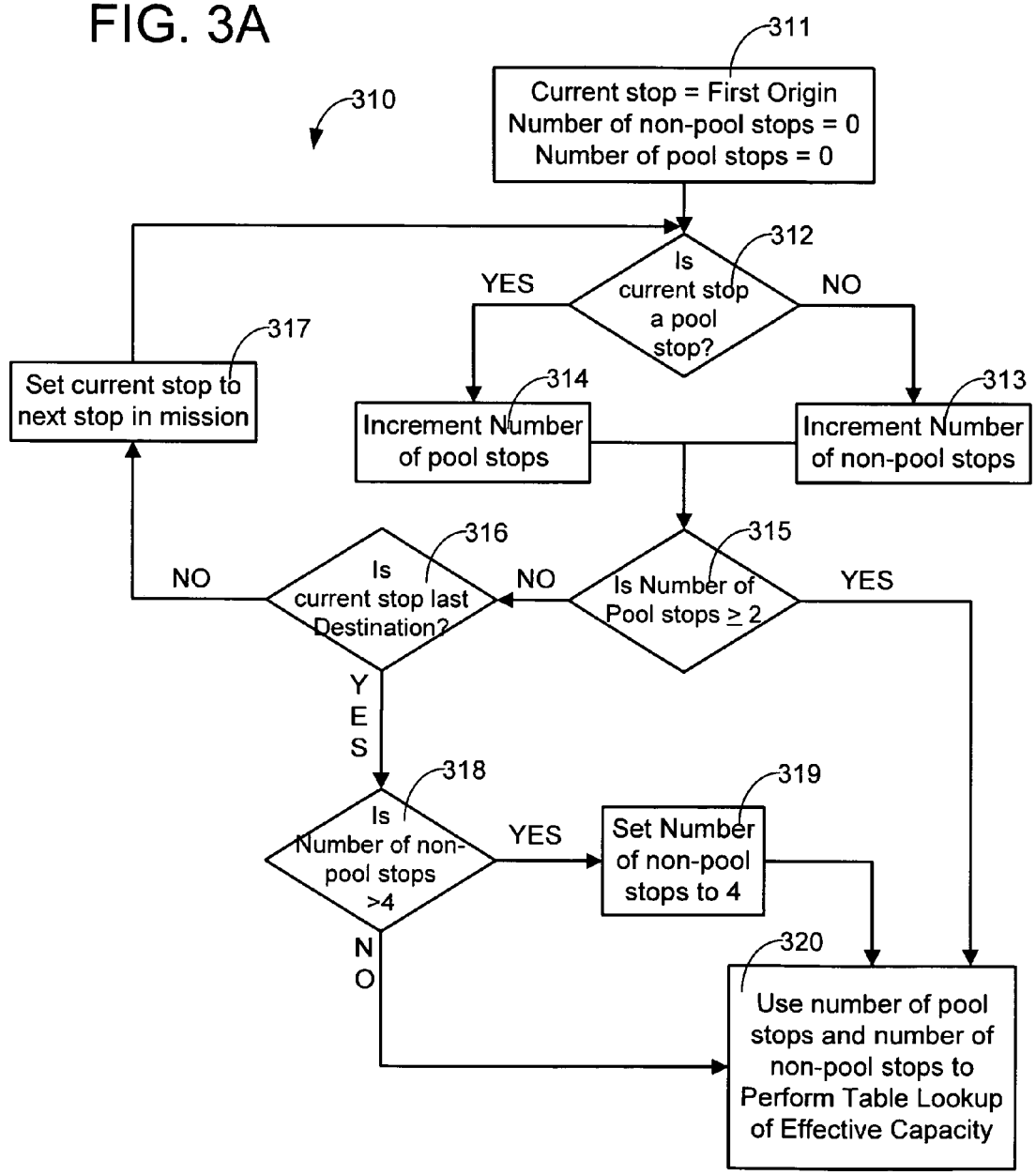

Some embodiments of the invention determine two independent measures of complexity of a proposed mission, and these two measures are used as indices into a two dimensional table, as discussed briefly below and in greater detail in reference to FIGS. 3A-3C. The two measures of mission complexity that are used in some embodiments are: (1) number of stops and (2) type of stops (whether pooling or non-pooling). In one example, a mission that is proposed from an origin A to a destination D with two intermediate stops B and C, results in the just-described first measure of mission complexity to be determined by simply counting the number of intermediate stops, which has the value 2. In this example, if one of the stops is a pooling stop, then the just-described second measure of mission complexity (type of stops) has the value 1. In a variation of this example, if no stop is a pooling stop then this second measure of mission complexity has the value 0.

In several embodiments of the invention, these two measures of mission complexity are used as two indices, to look up a two-dimensional table of effective capacities for a given type of vehicle (such as a standard 53'×102" trailer) which is to be used in performance of the mission. The result of table look up is an effective capacity for the given type of vehicle, which is then compared, with the total freight to be carried in the mission, to decide whether or not the given type of vehicle is to be selected for performance of the mission. If the effective capacity (obtained from a table lookup) is insufficient for the total freight, then the mission is either not feasible (if the effective capacity is a hard constraint) or expensive (if on exceeding the effective capacity an additional cost is imposed by a soft constraint). The type of constraint and/or the table of effective capacities for each vehicle type may be stored in the programmed computer either by a transportation planner (also called "user") as illustrated by fields 601 in FIG. 6, or alternatively by a hosting service that is operating the computer or some combination thereof.

An implementation of act 201 (FIG. 2A), for determining the complexity of a proposed mission, is illustrated by method 310 (FIG. 3A), as follows. In act 311, a variable "current stop" is initialized to the first origin in the proposed mission (note that the first origin of each proposed mission is known from a process by which two trips are merged (to form a multi-stop trip) by deciding which of multiple combination thereof is technically feasible and economically less expensive). Moreover, also in act 311, two variables for the respective numbers of pool stops and non-pool stops are initialized to zero. Next, the computer is programmed to check if the current stop is a pool stop, as illustrated by act 312. If not, then control transfers to act 313 wherein the number of non-pool stops is incremented. If yes, then control transfers to act 314 wherein the number of pool stops is incremented. After either of acts 313 and 314, control transfers to act 315.

In act 315, the computer is programmed to check if the number of pool stops has become greater than or equal to 2, and if so control transfers to act 320 wherein this method 310 completes. Note that the value 2 used in act 315 forms the upper limit on the size of the table to be indexed by the number of pool stops. In act 315 if the answer is no then control transfers to act 316. In act 316, the computer is programmed to check if the last destination in the proposed mission has been reached, and if not then control transfers to act 317. In act 317, the current stop is advanced to the next stop in the proposed mission, and control transfers to act 312 (discussed above).

In act 316, if the answer is yes, the computer is programmed to transfer control to act 318. In act 318, the computer checks if the number of non-pool stops is greater than 4, and if so the number of non-pool stops is reset to 4 in act 319 and control transfers to act 320. If the result in act 318 is no then control transfers directly to act 320. Once again, the value 4 being checked in act 318 forms the upper limit on the size of the table to be indexed by the number of non-pool stops. Note that different values for the upper limits in acts 315 and 318 may be used in different implementations.

In this particular implementation, in act 320, the number of non-pool stops and the number of pool stops that were computed by performing the rest of method 310 are used to perform a two dimensional lookup of a table along the X axis and the Y axis respectively as illustrated in FIG. 3B. Values in a table of the type shown in FIG. 3B may be all individually set, for each cell therein. In some embodiments the total number of such values (which must be received from a human as input to the computer) is made smaller than the number of cells in the table by re-using certain values as shown in FIG. 3B. In the example of FIG. 3B, the effective capacity for a two stop mission with no pooling stops is used for all missions that have two or more non-pooling stops. Moreover, the effective capacity for a two pool mission is used for all missions that have two or more pooling stops. Finally, at a cell in the table for a mission with one pool stop and two non-pool stops, the smaller of the following two effective capacities is used: (1) two non-pool stops and (2) one pool stop.

Note that in the illustration of FIG. 3B, stop count includes the origin and the destination. Also, no valid trip exists with no pool stops and no non-pool stops, or just one pool stop, or one non-pool stop, that is, at least two stops are required to make a trip. If a trip has two stops and both are non-pool stops, then the effective capacity of the vehicle is the effective capacity of a direct move. The value of the effective capacity of a direct move is retrieved from a second table which is populated in the computer by a human (not shown in FIG. 3B; see FIG. 2B). In the table of FIG. 3B, consider the intersection cell of 0 pool stops and 2 non-pools: if a trip has two stops and both are pool stops, then the effective capacity of the vehicle is effective capacity of a two-pool move (which, as noted above, is retrieved from the second table). If a trip has two stops and one was a pool stop and the other a non-pool stop, then the effective capacity of the vehicle is effective capacity of a pool move.

In the table shown in FIG. 3B, for any trip with more than two pool stops, the effective capacity is that of the volume capacity of a two pool move. If a trip has three stops and all of them are non-pool stops, then the effective capacity of the vehicle is the effective capacity of a one stop move. If a trip includes four stops and all of them are non-pool stops, then the effective capacity of the vehicle is the effective capacity of a two stop move. For any trip with more than three non-pool stops (and no pool stop or one pool stop), the effective capacity is that of the volume capacity of a two stop move. If three stops are present on a trip, and two of the stops are non-pool stops and one is a pool stop, then the effective capacity of the vehicle is the minimum of the effective capacity of a pool move and the effective capacity of a two stop move.

Note that mission dependent capacity is used in some embodiments only in non-palletized planning of transportation moves. In several such embodiments, for planning moves of palletized goods, the computer is programmed to use the direct move capacity as the effective volume capacity, regardless of the attributes of the mission involved.

An implementation of act 202 (FIG. 2A), for computing the freight to be moved in a proposed mission, is illustrated by method 330 (FIG. 3C), as follows. In act 331, a first variable "current stop" is initialized to the first origin in the proposed mission, a second variable "current shipment" is initialized to the first shipment in the proposed mission, and a third variable "total freight" is initialized to freight of the current shipment. Next, the computer is programmed to check if all shipments originating at the current stop have been processed, and if the answer is no then control transfers to act 333 where the current shipment is set to the next shipment that originates at the current stop, followed by transfer of control to act 334. In act 334, the total freight is incremented with freight from the current shipment and control returns to act 332 (discussed above). In act 332 if the answer is yes, control transfers to act 335.

In act 335, the computer is programmed to check if all shipments passing through (i.e. not being picked up or dropped off) at the current stop have been processed, and if the answer is no then control transfers to act 336 where the current shipment is set to the next shipment that passes through the current stop, followed by transfer of control to act 334 (described above). In act 335, if the answer is yes, control transfers to act 337 wherein the total freight for the current stop is stored into an array that is indexed by the number of stops.

Next, after act 337, control transfers to act 338 wherein the computer checks if the current stop is the last destination. If no, control transfers to act 339 wherein the current stop is set to the next stop in the proposed mission, and the variables for the current shipment and total freight are reset to zero, followed by returning to act 332 (discussed above). In act 338 if the answer is yes, then control transfers to act 340 wherein the computer finds a maximum of all of the total freight amounts (e.g. volumes) that have been stored (in act 337). Next, control transfers to act 341 wherein the computer checks if the maximum total freight amount (e.g. volume) is less than the effective capacity as determined by performing the table lookup (in act 320 discussed above), and if true goes to act 342 (wherein the proposed mission is further processed for economic value), and if false goes to act 343 (wherein the proposed mission is discarded or a penalty is assessed).

In several embodiments of the invention, the computer is programmed to perform method 400 (FIG. 4), which provides an illustration of use of mission specific vehicle capacity constraints in load consolidation. Specifically, in act 401, the computer groups all shipment orders by origin, into the sets VT(o1) to VT(on), wherein oi is the ith origin in a range of origins o1-on. Therefore, there are "n" such sets, if there are "n" unique origins. Next, one of these origins o is selected to be the current origin, and control transfers to act 402.

In act 402, the computer selects a first mission in the current origin's set VT(o) to be the current mission, and control transfers to act 403. In act 403, the computer calculates the cost decrease of eliminating the current mission, and control transfers to act 404. In act 404, the computer marks all missions in VT(o) that are capable of reaching the current mission's destination as candidates for consolidation with the current mission. Next, the computer selects a first candidate to be the current candidate and control transfers to act 405.

The capability of a vehicle to reach one destination from another destination is automatically determined in some embodiments of act 404, depending on whether the distance therebetween is less than a predetermined limit (referred to as "stop radius"). As illustrated in FIG. 4B, destination D2 of a candidate mission 462 is within stop radius 469 of destination D1 of current mission 461. However, destination D3 is not within this stop radius 469 from destination D1. Note that after combination of the current and candidate missions, a vehicle that is performing the combined mission can reach destination D3 of mission 463 because destination D3 is within the stop radius of destination D2. The stop radius can have any value specified by the transportation planner. Note that in most embodiments, the distance between an origin and a destination is independent of the stop radius.

In act 405, the computer determines an effective capacity of the vehicle in view of the complexity of a new mission obtained by combination of the current candidate and the current mission, and then checks if the total freight in the new mission is less than this effective capacity. If so, the new mission is feasible (either under a hard constraint or with a penalty cost under a soft constraint), and control transfers to act 406. In the example illustrated in FIGS. 4B-4D, the computer checks if all shipment orders for destination D1 and all shipment orders for destination D2 occupy less volume than the effective capacity of a "one stop" move (i.e. a move with one intermediate stop and no pool stops).

In act 406, the computer determines if there is a non-empty intersection at the origin for the pickup schedules of the current candidate and the current mission, and if both destinations can be reached within the respective dropoff schedules. If the schedules match at origin as well as at the destinations, the combination of the current candidate and the current mission is evaluated for economic viability as per acts 407 and 408. In act 407, the computer calculates the cost difference between the combination and the current mission, i.e. the increase in cost due to adding the current candidate's destination to the current mission.

Note that in computing such costs, the computer may be programmed to include one or more layover charges that may arise from a difference in the consignee's hours of receipt and the carrier's normal business hours. The specific manner in which layover charges are computed is not a critical aspect of some embodiments. For other embodiments, layover charges are computed as described in the U.S. patent application Ser. No. 11/136,167 entitled "SCHEDULING WITH LAYOVERS AND LAYOVER CHARGE COMPUTATION IN TRANSPORTATION PLANNING" filed May 23, 2005 by Javier Nicolas Sanchez et al., which is incorporated by reference herein in its entirety.

The computer may be further programmed to take into account a carrier's charge for making additional stops, which may depend on the number of stops already being made in the current mission. For example, a first additional stop may be charged at $150, a second additional stop at $200, a third additional stop at $300 and all further additional stops at $400.

Then in act 408 the computer calculates the total gain of insertion. The total gain is computed as a difference between the additional cost resulting from combining the current candidate into the current mission, less the savings from eliminating the current candidate.

Next, in act 409 the computer repeats acts 405-408 with any other combinations that can be made with the current candidate and the current mission (i.e. because they are combinable in more than one way). For example, a current candidate 461 and a current mission 462 (FIG. 4B) are combinable in two ways as shown in FIGS. 4C and 4D. Therefore, if the combination in FIG. 4C is initially processed by acts 405-408 then the combination in FIG. 4D is now processed in act 409. Then the computer chooses whichever combination provides greater total gain. Note that the combinations may provide different total gain because cost is a function of mileage and lanes, which may be different for the combinations O-D1-D2 and O-D2-D1.

Moreover, as noted above, D3 becomes a candidate for addition to this new mission being created, because D3 is within the stop radius of D2. Therefore, some embodiments of the invention evaluate (in act 409) all possible combinations of D3 with each of the two combinations of D1 and D2 in the above described manner. In doing so, the computer checks if all shipment orders for destinations D1, D2 and D3 occupy less volume than the effective capacity of a "two stop" move (i.e. a move with two intermediate stops and no pool stops).

Note that in adding stops to the current mission in any of acts 405-409, the computer may further take into account one or more limitations imposed by the carrier such as the maximum number of stops, and also any limitations imposed by commodity incompatibilities. Note also that in adding such stops, the computer may also compute the percentage utilization of the vehicle, and compare it to a predetermined percentage to decide if no more shipments should be added. For example, if in a proposed mission the effective capacity is more than 90% utilized, then no further shipments are added. "Utilization" here may mean either average or peak utilization, depending on the embodiment. The average utilization, for the combination shown in FIG. 4C, is calculated by the computer as follows (0.95*100+0.75*20)/120=92%. The peak utilization is simply the highest utilization at any point in the trip (in this case, 95%). In FIG. 4C, as the average utilization exceeds the predetermined percentage, the computer stores this combination in set IS (as discussed next), and hence the addition of stop D3 need not be considered.

Next, in act 410 the computer records a chosen combination (that provides the greatest gain) in a set IS. Set IS holds all proposed missions that are found to be feasible, for later use in a set partition process (see acts 417 et seq). Note that the chosen combination is recorded in act 410 only if the gain resulting therefrom is positive. Next, control transfers to act 411, wherein the computer checks if all candidates have been processed and if not, goes to act 412 to select the next candidate and thereafter proceeds to act 405 (described above).

If the answer in act 411 is yes, then control transfers to act 413 and the computer checks if all missions have been processed and if not goes to act 414 to select the next mission and thereafter proceeds to act 403 (described above). If the answer in act 413 is yes, then control transfers to act 415 and the computer checks if all origins have been processed and if not goes to act 416 to select the next origin and thereafter proceeds to act 402 (described above). If the answer in act 415 is yes, then control transfers to a set partition process 420, as discussed next.

Figure 4A:
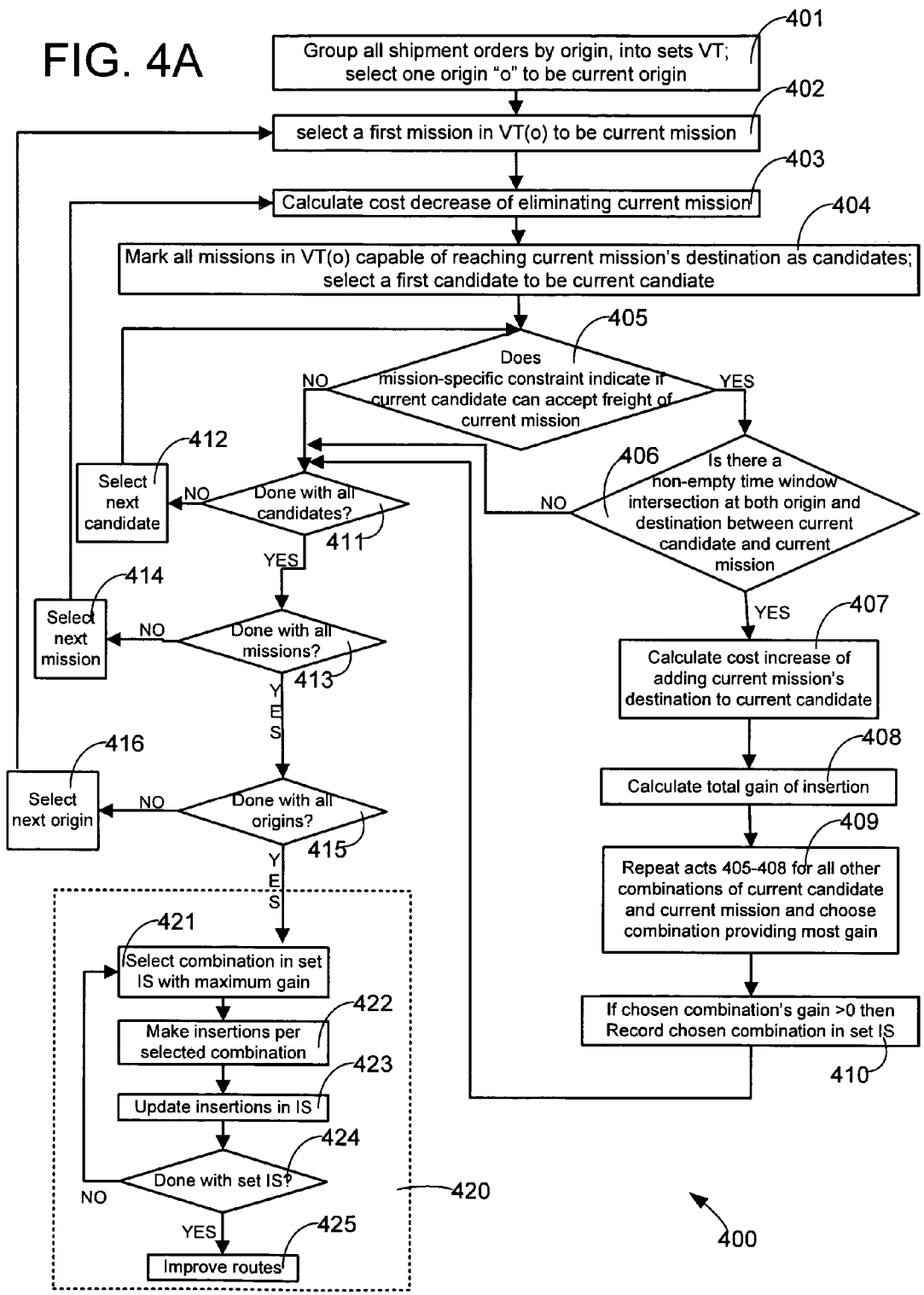
FIG. 4A illustrates, in a flow chart, a portion of a load consolidation process that uses the method of FIGS. 3A and 3C, in some embodiments of the invention.
Figure 4B:
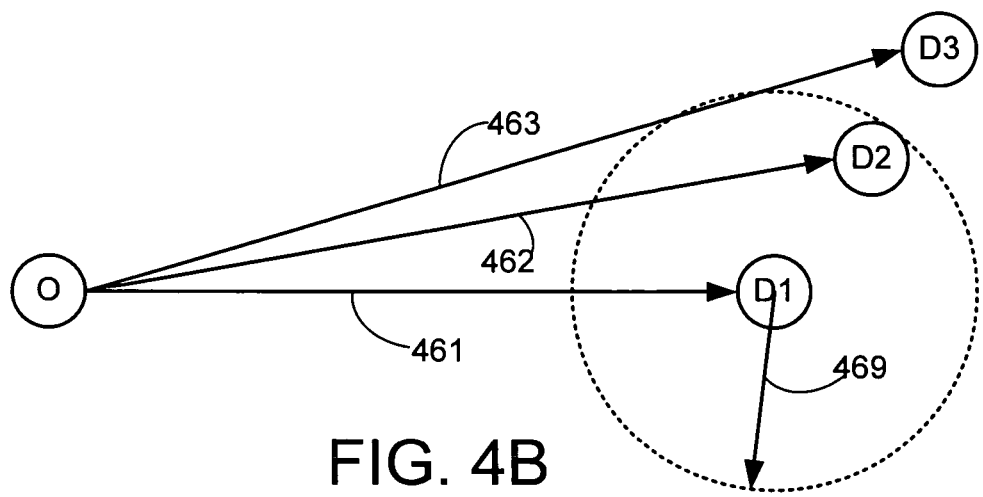
FIGS. 4B-4D illustrate how certain missions are selected for combination, during load consolidation that uses mission specific capacity constraints in accordance with the invention.
Figure 4C:
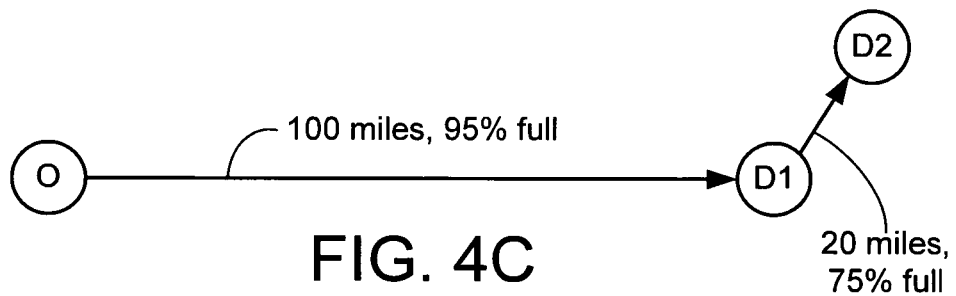
Figure 4D:
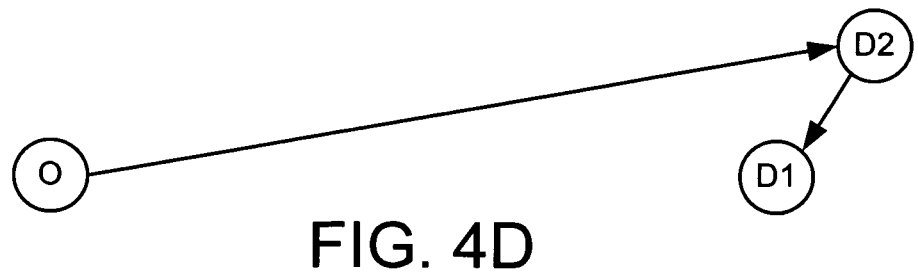

In the set partition process 420, the computer performs acts 421-425 (FIG. 4A). Specifically, in act 421, the computer selects one of the combinations in set IS, e.g. the combination that provides the highest gain in set IS. Note that other embodiments may use one or more other criteria in selecting the combination in act 421. Regardless of how it is selected, the selected combination is used in act 422, wherein the computer makes one or more insertions to a pre-existing mission. The insertions are made to add a candidate to the pre-existing mission, thereby to make the selected combination into a new mission.

Next, in act 423, the computer recalculates the gains for those combinations in set IS that contain one or more of the stops added in act 422. Then in act 424, the computer checks if all combinations in set IS have been processed and if not, returns to act 421 (described above). If all combinations have been processed, then control transfers to act 425, wherein the computer performs another process to improve the routes.

Specifically, in act 425, the computer sorts all missions into two groups, a first group whose utilization exceeds the predetermined percentage as described above, and a second group contains the remaining missions. Then the computer schedules the missions in the first group for performance. Missions in the second group are subject to further consolidation as discussed next.

Note that method 400 of FIG. 4A (also called "step 1") merely illustrates use of mission specific capacity constraints in consolidation of missions that have a common origin. Load consolidation can also be performed on missions that have a common destination (in an additional step called "step 2"). Specifically, in step 2 of some embodiments, a method similar or identical to that shown in FIG. 4A is performed on missions with their topology reversed (e.g. origins treated as destinations and vice versa). Note that the just-described step 2 receives as input only those missions that are still unscheduled, i.e. that are in the second group as discussed in the previous paragraph. On completion of this step 2, the second group contains missions that are subject to additional consolidation as discussed next. Note that in the pseudo-code attached below, LIST1 and LIST2 are lists of trips, not lists of orders. Although LIST1 and LIST2 correspond to the same unscheduled orders, LIST1 (from step 1) contains a list of single-origin multi-stop trips covering such orders, while LIST2 (from step 2) contains a list of single-destination multi-stop trips covering such orders, so LIST1 and LIST2 contain different trips.

Any missions that remain unscheduled at this stage are thereafter subjected to further consolidation with one another if any portion of their routes overlap with each other. The exact process by which this additional consolidation is implemented differs depending on the embodiment. One illustrative process is described below, in the form of pseudo code, which is listed below, just before the claims. Note that in the pseudo code, at lines 34-35, the computer checks the vehicle's physical volume limit, not mission specific capacity. Instead, the mission specific capacity is used as a constraint in the trip's penalty cost calculation, i.e. line 39, where a penalty for violating hard/soft effective vehicle capacity constraint is computed.

Method 210 (FIG. 2C) is used to program a computer system 500 of the type illustrated in FIG. 5A which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, transportation planning is performed by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIG. 2A. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 505 for execution. Such a storage medium may take many forms, including but not limited to, non-volatile storage media, and volatile storage media. Non-volatile storage media includes, for example, optical or magnetic disks, such as storage device 510. Volatile storage media includes dynamic memory, such as main memory 506.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, as described hereinafter, or any storage medium from which a computer can read.

Various forms of computer readable storage media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 528 now commonly referred to as the "Internet". Local network 522 and network 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a mission (which is part of a transportation plan) through Internet 528, ISP 526, local network 522 and communication interface 515.

The instructions for performing method 210 (FIG. 2C) may be executed by processor 505 as they are received, and/or stored in storage device 510, or other non-volatile storage for later execution. In this manner, computer system 500 may obtain the just-described instructions and any related data in the form of a carrier wave.

Figure 5A:
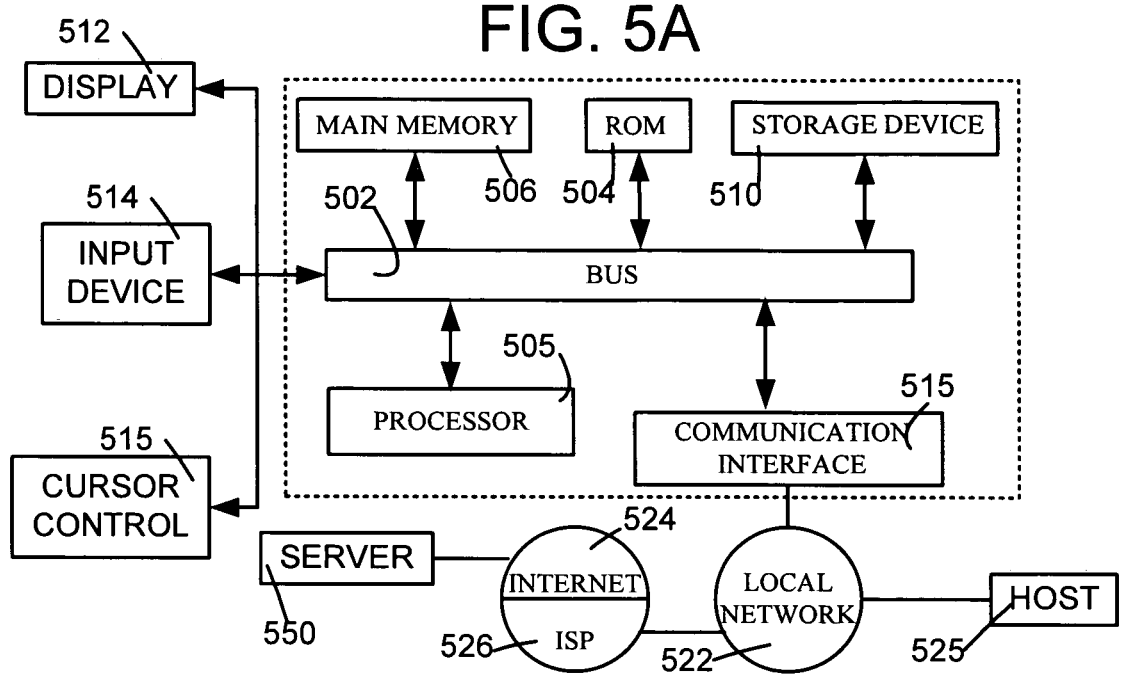
FIGS. 5A and 5B illustrate, in block diagrams, hardware and software portions of a computer that performs the method illustrated in FIG. 2A.
Figure 5B:
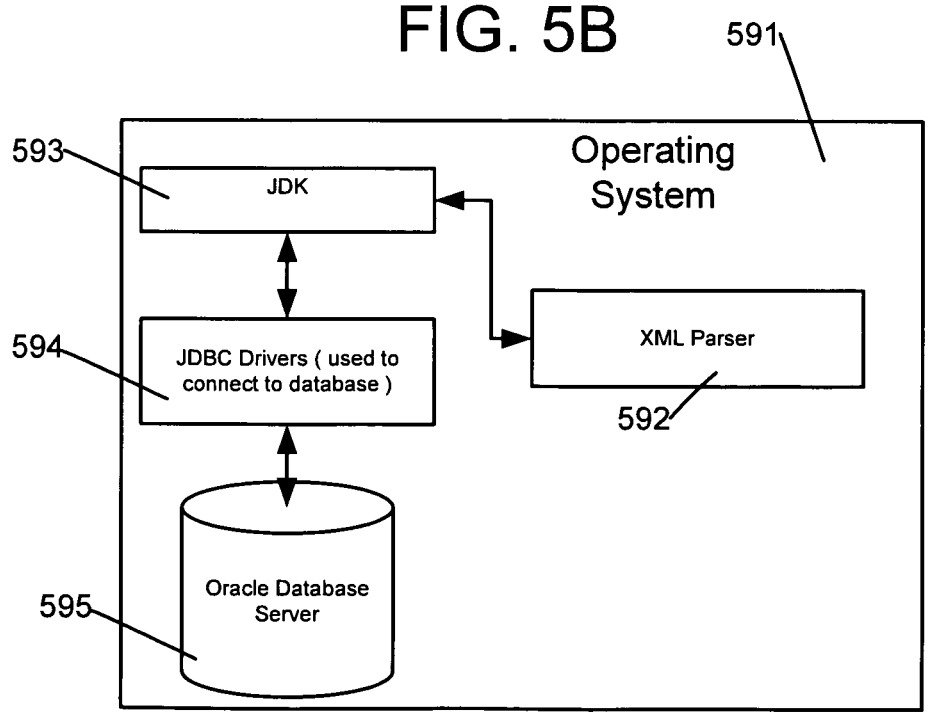

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Numerous modifications and adaptations of the embodiments described herein will become apparent to the skilled artisan in view of this disclosure. Note that although some embodiments use two mission complexity measures individually, to perform a lookup of a two-dimensional table, other embodiments may use a single mission complexity measure to look up a one-dimensional table. In one such other embodiment of the invention, each non-pooling stop is assigned a value of 1 and each pooling stop may be assigned a value of 10, and all values of stops in a trip may be added up to obtain a single mission complexity measure. An embodiment of this method works by a assigning a value to each stop based on the stop's attribute and then obtains a value for the trip by summing the values of all stops and then obtain a capacity as a function of the trip's value. In another such embodiment, the number of stops and the type of stops are supplied as inputs to a function that combines them using one or more mathematical operators such as multiply (e.g. the number of stops may be multiplied by the type of stops to yield a single measure of mission complexity).

Although certain attributes of a mission that contribute to its complexity are discussed above for some embodiments to identify an effective capacity of a vehicle that is to perform the mission, other embodiments may use other indicators of mission complexity either additionally or as alternatives. In a first example, some embodiments use types of loading/unloading/handling equipment available at specific stops as an alternative or additional indicator of mission complexity for determining effective capacity of a vehicle. In a second example, some embodiments use spacing, airflow, and ventilation requirements of the goods to be transported as alternative or additional indicators of mission complexity that are used in determining a vehicle's effective capacity. In a third example, some embodiments use as attributes of a mission to determine a vehicle's effective capacity: pallet positions occupied by, floor space required by, and/or size and/or shape and/or weight and/or cube and/or dimensional attributes of different commodity items carried on the mission.

Numerous modifications and adaptations of the embodiments described herein are encompassed by the scope of the invention. In some embodiments, for non-palletized planning, the computer considers the mission-dependent capacity when deciding whether or not to include shipments onto the truck or trailer. Note that the mission-dependent capacity only applies to the volume dimension of the goods being shipped in some embodiments, which means that the computer uses different effective volume capacity of the truck depending on the different type of the movement/trip, while for weight, the computer uses the maximum load weight of the truck regardless of the mission's attributes. Below lists all types of mission-dependent volume capacities used by a computer of some embodiments:

Direct move effective volume capacity
  Pool move (one-pool) effective volume capacity
  One-stop move effective volume capacity
  Two-stop move effective volume capacity
  Two-pool effective volume capacity
  Three-pool effective volume capacity Logic to find the mission-dependent volume capacity of the truck as programmed into such a computer is as described next. Specifically, given a certain number of stops in a Truck-Load (TL) trip, the computer first determines how many pool stops are present in this trip; secondly, it generates a mission index according to the number of pool stops and the number of non-pool stops in this trip, then finds the mission-dependent volume capacity using this mission index. The just-described mission-dependent volume capacity is used automatically, as a limit in deciding whether or not additional freight can be consolidated into this trip.

The following APPENDIX (PSEUDOCODE) contains pseudocode and related description which form integral portions of this detailed description and are incorporated by reference herein in their entirety. This Appendix contains illustrative implementations of acts that are described above as being performed in some embodiments. Note that the following pseudocode is not written in any particular computer programming language. Instead, the pseudocode provides sufficient information for a skilled artisan to translate the pseudocode into a source code suitable for compiling into object code.

Appendix (Pseudocode)

Initialize an empty list of output trips (LISTA)
  Start with two lists of less than 90% TL trips (LIST1 and LIST2).
  Note that all these unscheduled orders are also in USODSET and Non-Full-Direct-TL-List. USODSET is the set that keeps unscheduled orders, while SODSET is the set that keeps scheduled orders. Initially each order is unscheduled and is put into USODSET, but after the engine generates some trip(s) for that order, this order is moved from USODSET to SODSET. Non-Full-Direct-TL-List is a list of non-full (i.e. less than 90% full) direct TL trips, which are the output of simple consolidation as well as the input to the multi-stop trip generation, i.e., the multi-stop trip generation will manipulate on these non-full direct TLs to further generate some multi-stop TLs. As mentioned in the following pesudo-code—"each non-full-direct-TL (DTL i) in Non-Full-Direct-TL-List"—DTL i is a non-full direct TL trip in Non-Full-Direct-TL-List.

While LIST1 and LIST2 aren't empty

```
{
    Sort all the trips in LIST1 and LIST2 by descending order of fullness
    Pick up the trip (t1) with highest fullness
    Remove those orders covered by t1 from Non-Full-Direct-TL-List
    For each non-full-direct-TL (DTL i) in Non-Full-Direct-TL-List
    {
        If its distance to the trip t1 is no greater than 2r (r is the
        neighborhood radius)
        (NOTE that DTL i's distance to t1 = the minimum distance
        from DTL i's origin to t1's origins + the minimum distance
        from DTL i's destination to t1's destinations)
        {
```

Add this candidate order DTL i into a PQ, with ascending order of distance to the trip t1

An abbreviation "PQ" used above means a priority queue. Priority queue PQ is used to sort all the non-full direct TLs with ascending order of distance to trip t1.

Another abbreviation "PE" is used below to mean a primary equipment/vehicle type, which is the primary vehicle used in this engine to generate that TL trip based on its origin to destination lane.

```
        }
    }
    Iterate through the candidate non-full-direct-TL PQ
    {
        Try to add the non-full-direct-TL DTL i into each possible
        position in trip t1
        (Strategy: Given a sequence of origins/destinations covered
        by the trip t1 now, try to insert DTL i's origin/destination into
        each possible position/leg while keeping that original
        sequence.)
        For each possible insertion position
        {
            If the new trip doesn't exceed the TL physical volume
            limit AND there exists non-empty time window
            intersection at any merged stop(s) AND it respects
            LIFO (last in, first out rule)
            {
                Compute the total cost (= actual cost + penalty cost)
                of the new trip
                Record the best insertion position with the least total
                cost of the new trip
            }
        }
        If (we find a best insertion position AND total cost of the new
        trip < total cost of old trip tl + total cost of direct TL DTL i)
        Add the order ODi into the best position in trip t1
    }
    Add the final trip t1 into LISTA
    Remove all the orders covered by the final trip t1 from Non-Full-
    Direct-TL-List, LIST1 and LIST2
}
Iterate through each trip in the list of trips (LISTA)
{
If the trip t reaches a predetermined Min-TL utilization, i.e. >= 50% TL
Note: If so, this trip will be passed to the set-partitioning problem
    {
    Push TRIPi(TL, t, PE) into TRIPSET
    If it also reaches the predetermined Full-Enough-TL threshold, i.e.
```

-continued

```
            >= 90% TL
            {
                Move all the orders within this trip from USODSET to
                SODSET
            }
            Else, all the orders covered by this trip remain unscheduled
        }
    Else, do not keep this trip
}
```

Description: return the mission-dependent volume capacity of the given TL double findMissionDependentCapacity (TPSingleTruckLoad & t)

```
{
    Get the list of stops in this TL trip t;
    Set counter_pool_stop = 0;
For each stop in the list of stops
{
If it's a pool stop
counter_pool_stop = counter_pool_stop + 1;
}
    Set counter_non_pool_stop = total number of stops −
counter_pool_stop;
If counter_non_pool_stop is 2 AND counter_pool_stop is 0
        Return direct move effective volume capacity;
    Else if counter_non_pool_stop is 1 AND counter_pool_stop is 1
        Return pool move effective volume capacity;
    Else if counter_non_pool_stop is 3 AND counter_pool_stop is 0
        Return one-stop move effective volume capacity;
    Else if counter_non_pool_stop is >= 3 AND
    counter_pool_stop is
<= 1
Return two-stop move effective volume capacity (Note: defined
after one-
stop move);
    Else if counter_pool_stop is 2
        Return two-pool move effective volume capacity;
Else if counter_pool_stop is >= 3
        Return three-pool move effective volume capacity;
        Else if counter_non_pool_stop is 2 and counter_pool_stop is 1
Return Min (pool move effective volume capacity, two-stop move
effective
volume capacity) as its effective volume capacity.
}
```

Note: the pseudo code to determine if a trip stop is a pool stop or not is as follows:

Description: return true if the given trip stop is a pool stop, otherwise return false.

```
bool isPoolStop (TPTripStop & s)
{
If this stop s is at a Hub (consolidation and/or deconsolidation allowed)
    {
Get all the stop details (loaded or unloaded) at this stop;
Here stop details mean all the load and unload activities at this stop. For
this invention, the related details include:
            It's either a loading or unloading activity
            Which order to be loaded or unloaded
Create a set S1 to hold the unique origin(s) of the left sibling(s);
For each stop detail at this stop
{
If it's load activity for a sub-order-leg
        {
If this sub-order-leg has left sibling
            {
Insert the origin of left sibling sub-order-leg into S1
If S1 have more than 1 element,
Then this stop is a pool stop, return true;
            }
        }
    }
Create a set S2 to hold the unique destination(s) of the right sibling(s);
For each stop detail at this stop
{
        If it's unload activity for a sub-order-leg
            {
                If this sub-order-leg has right sibling
                {
Insert the destination of right sibling sub-order-leg into S2;
If S2 have more than 1 element,
Then this stop is a pool stop, return true;
                }
            }
        }
    }
            If we reach here, this stop is not a pool stop, return
false;
}
```

Mission-dependent capacity is considered by the computer as follows. In split large order, the computer uses the direct move effective volume capacity of the truck to do splitting. In simple consolidation, whenever the computer tries to add a shipment to an existing truckload, it calls the following API checkVehicleCapacity( ) for the vehicle capacity check.

Description: check the given TL trip against the physical volume limit of the vehicle, and the effective vehicle capacities.
void checkVehicleCapacity (TPSingleTruckLoad & t)

```
{
First, make sure that it doesn't exceed the physical volume limit of the
truck (otherwise, discard this trip);
Second, find the max weight capacity, max pallet capacity, and the
mission-dependent volume capacity of the truck by calling the API
findMissionDependentCapacity( );
Then, check if there's any violation against such capacities, if so, compute
the penalty cost using such violation.
}
```

In single-depot multi-stop trip building, the computer tries to insert a trip stop into a single-depot TL; while in pick-up-drop-off multi-stop trip building, the computer tries to add a direct TL to any existing multi-stop TL. In each case, the computer tries the different options for the insertion. For each option of the insertion, the computer calls the above API checkVehicleCapacity( ) for the vehicle capacity check.

In selecting a carrier (or truckload service), for each TL trip, the computer first populates a list of candidate carriers/carrier services, then does repair based on carrier capacity and contractual commitments. In this stage, the mission-dependent capacity is involved when populating each candidate carrier/carrier service, i.e., for any candidate carrier/carrier service, the computer calls the above API checkVehicleCapacity( ) for the vehicle capacity check.

What is claimed is:

1. A computer-implemented method of planning movement of freight using vehicles, the computer-implemented method comprising:
automatically determining unloading/loading complexity of a mission in terms of a mission type, by using a first formula or a first table or a first logic based on a number of pooling stops and a number of non-pooling stops of the mission;
wherein each stop is to be made in executing a plurality of orders for movement of freight to be delivered by a vehicle of a specific size performing the mission;

automatically determining one effective vehicle capacity among multiple effective vehicle capacities of the vehicle, by using a second formula or a second table or a second logic that provides different values for different complexity missions, the second formula or the second table or the second logic being based on the mission type and the specific size of the vehicle;

wherein the multiple effective vehicle capacities progressively reduce the amount of freight that can be moved by the vehicle, as the number of pooling stops and the number of non-pooling stops increase;

wherein each effective vehicle capacity, in the multiple effective vehicle capacities, is less than the specific size of the vehicle;

a computer automatically deciding on feasibility of performing the mission using the vehicle of the specific size, by comparing the one effective vehicle capacity and a maximum of total freights to be carried by the vehicle at stops in the mission; and said computer automatically storing in a memory, a result obtained by said computer automatically deciding on feasibility.

2. The computer-implemented method of claim 1 wherein:
the automatically deciding on feasibility comprises computing a penalty cost that depends on a difference between the maximum and the one effective vehicle capacity.

3. The computer-implemented method of claim 1 further comprising:
automatically picking from among all orders for freight movement, said plurality of orders to be consolidated into said mission, when the orders being picked are found by said computer to have at least a partial overlap with one another in respective paths.

4. The computer-implemented method of claim 1 further comprising:
automatically retrieving from a database, said all orders for freight movement including the plurality of orders, by using a database management system; and
automatically storing the mission in said database.

5. The computer-implemented method of claim 1 further comprising:
receiving as inputs through fields in a graphical user interface, said multiple effective vehicle capacities of said vehicle.

6. The computer-implemented method of claim 1 wherein:
the first table is a look up table.

7. The computer-implemented method of claim 1 wherein:
the second table is a look up table.

8. The computer-implemented method of claim 1 wherein:
the mission type is determined by use of the first formula.

9. The computer-implemented method of claim 1 wherein:
the one effective vehicle capacity is determined by use of the second formula.

10. The computer-implemented method of claim 1 wherein:
the one effective vehicle capacity is determined by use of the second logic.

11. One or more non-transitory computer-readable storage media comprising computer executable instructions, when executed by at least one processor perform a computer-implemented method, the computer executable instructions comprising:
instructions to determine unloading/loading complexity of a mission in terms of a mission type, by using a first formula or a first table or a first logic based on a number of pooling stops and a number of non-pooling stops of the mission;

wherein each stop is to be made in executing a plurality of orders for movement of freight to be delivered by a vehicle of a specific size performing the mission;

instructions to determine one effective vehicle capacity among multiple effective vehicle capacities of the vehicle by using a second formula or a second table or a second logic that provides different values for different complexity missions, the second formula or the second table or the second logic being based on the mission type and the specific size of the vehicle;

wherein the multiple effective vehicle capacities progressively reducing the amount of freight that can be moved by the vehicle, as the number of pooling stops and the number of non-pooling stops increase;

wherein each effective vehicle capacity, in the multiple effective vehicle capacities, is less than the specific size of the vehicle;

instructions to decide on feasibility of performing the mission using the vehicle of the specific size, by comparing the one effective vehicle capacity and a maximum of total freights to be carried by the vehicle at stops in the mission; and instructions to store in a memory, a result of obtained by execution of the instructions to decide on feasibility.

12. The one or more non-transitory computer-readable storage media of claim 11 further comprising:
a graphical user interface comprising fields to receive input on said multiple effective vehicle capacities.

13. The one or more non-transitory computer-readable storage media of claim 11 wherein:
the instructions to decide on feasibility comprise instructions to compute a penalty cost that depends on a difference between the maximum and the one effective vehicle capacity.

14. The one or more non-transitory computer-readable storage media of claim 11 further comprising:
instructions to pick from among all orders for freight movement, said plurality of orders to be consolidated into said mission, when the orders being picked are found to have at least a partial overlap with one another in respective paths.

15. A computer comprising:
a processor and a memory coupled to the processor, the memory being encoded with a computer program comprising instructions executable by said processor to prepare missions for movement of freight using vehicles, wherein said instructions are at least to:

determine unloading/loading complexity of a mission in terms of a mission type, by using a first formula or a first table or a first logic based on a number of pooling stops and a number of non-pooling stops of the mission;

wherein each stop is to be made in executing a plurality of orders for movement of freight to be delivered by a vehicle of a specific size performing the mission;

automatically determine one effective vehicle capacity among multiple effective vehicle capacities of the vehicle by using a second formula or a second table or a second logic that provides different values for different complexity missions, the second formula or the second table or the second logic being based on the mission type and the specific size of the vehicle;

wherein the multiple effective vehicle capacities progressively reduce the amount of freight that can be moved by the vehicle, as the number of pooling stops and the number of non-pooling stops increase;

wherein each effective vehicle capacity, in the multiple effective vehicle capacities, is less than the specific size of the vehicle;

decide on feasibility of performing the mission, using the vehicle of the specific size, by comparing the one effective vehicle capacity and a maximum of total freights to be carried by the vehicle at stops in the mission; and store in the memory, a result obtained by execution of the instructions to decide on feasibility.

16. The computer of claim 15 further comprising:

a graphical user interface comprising fields to receive input on said multiple effective vehicle capacities.

17. The computer of claim 15 wherein the instructions are further to:

decide on feasibility comprise instructions to compute a penalty cost that depends on a difference between the maximum and the one effective vehicle capacity.

18. The computer of claim 15 wherein the instructions are further to:

pick from among all orders for freight movement, said plurality of orders to be consolidated into said mission, when the orders being picked are found by said computer to have at least a partial overlap with one another in respective paths.

19. An apparatus for preparing missions for movement of freight using vehicles, the apparatus comprising:

means for determining unloading/loading complexity of a mission in terms of a mission type, by using a first formula or a first table or a first logic based on a number of pooling stops and a number of non-pooling stops of the mission;

wherein each stop is to be made in executing a plurality of orders for movement of freight to be delivered by a vehicle of a specific size performing the mission;

means for automatically determining one effective vehicle capacity among multiple effective vehicle capacities of the vehicle by using a second formula or a second table or a second logic that provides different values for different complexity missions, the second formula or the second table or the second logic being based on the mission type and the specific size of the vehicle;

wherein the multiple effective vehicle capacities progressively reduce the amount of freight that can be moved by the vehicle, as the number of pooling stops and the number of non-pooling stops increase;

wherein each effective vehicle capacity, in the multiple effective vehicle capacities, is less than the specific size of the vehicle;

means for deciding on feasibility of performing the mission using the vehicle of the specific size, by comparing the one effective vehicle capacity and a maximum of total freights to be carried by the vehicle at stops in the mission; and means for storing a result obtained by said means for deciding on feasibility.

20. The apparatus of claim 19 further comprising:

a graphical user interface comprising fields to receive input on said multiple effective vehicle capacities.

* * * * *

UNITED STATES PATENT AND TRADEMARK OFFICE
CERTIFICATE OF CORRECTION

| | | |
|---|---|---|
| PATENT NO. | : 8,626,540 B2 | Page 1 of 1 |
| APPLICATION NO. | : 11/136045 | |
| DATED | : January 7, 2014 | |
| INVENTOR(S) | : Peterkofsky et al. | |

It is certified that error appears in the above-identified patent and that said Letters Patent is hereby corrected as shown below:

On the Title Page, Item (56)

On page 2, column 1, under Other Publications, line 21, delete "Japen," and insert -- Japan, --, therefor.

On page 2, column 2, under Other Publications, line 24, delete "Long-Hault" and insert -- Long-Halt --, therefor.

In the Specification

In column 10, line 33, delete "20850" and insert -- 20850; --, therefor.

In column 10, line 41, delete "Manahattan" and insert -- Manhattan --, therefor.

In column 20, line 6, delete "pesudo-code–" and insert -- pseudo-code– --, therefor.

In the Claims

In column 24, line 27, in Claim 11, delete "of obtained" and insert -- obtained --, therefor.

Signed and Sealed this
Twenty-ninth Day of July, 2014

Michelle K. Lee
*Deputy Director of the United States Patent and Trademark Office*